(12) United States Patent
Lang et al.

(10) Patent No.: US 12,055,530 B2
(45) Date of Patent: Aug. 6, 2024

(54) AUTOMATED SYSTEM FOR ONLINE DETECTION OF ORGANIC MOLECULAR IMPURITIES IN SEMICONDUCTOR GRADE CHEMICALS

(71) Applicant: Elemental Scientific, Inc., Omaha, NE (US)

(72) Inventors: Alexander Lang, Omaha, NE (US); Brianna Dufek, Omaha, NE (US); Daniel R. Wiederin, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 814 days.

(21) Appl. No.: 17/125,222

(22) Filed: Dec. 17, 2020

(65) Prior Publication Data

US 2021/0181165 A1 Jun. 17, 2021

Related U.S. Application Data

(60) Provisional application No. 62/949,411, filed on Dec. 17, 2019.

(51) Int. Cl.
*G01N 30/00* (2006.01)
*G01N 30/72* (2006.01)
(Continued)

(52) U.S. Cl.
CPC ........ *G01N 30/724* (2013.01); *H01J 49/0036* (2013.01); *H01J 49/0422* (2013.01);
(Continued)

(58) Field of Classification Search
CPC .. G01N 30/724; G01N 35/1097; G01N 30/88; G01N 2030/143; G01N 2030/8804;
(Continued)

(56) References Cited

U.S. PATENT DOCUMENTS 10,018,543 B1 * 7/2018 Wiederin ............... B01D 15/08
10,373,838 B2    8/2019 Uhlmeyer et al.
(Continued)

FOREIGN PATENT DOCUMENTS

KR    20170067661 A    6/2017

OTHER PUBLICATIONS

PCT International Search Report and Written Opinion for PCT/US2020/065598, dated Apr. 15, 2021.

*Primary Examiner* — Michael Maskell
(74) *Attorney, Agent, or Firm* — Kevin E. West; Advent, LLP

(57) ABSTRACT

An embodiment of an analysis system can include an initial multi-port valve, at least one intermediate multi-port valve, a further multi-port valve, and a time-of-flight mass spectrometer (TOF-MS). The initial multi-port valve can be configured to receive a sample. The at least one intermediate multi-port valve can be fluidly connected to the initial multi-port valve and configured to receive the sample from the initial multi-port valve. A given intermediate multi-port valve can have an ion-exchange column associated therewith. The given intermediate multi-port valve can be configured selectably to one of direct the sample through the ion-exchange column associated therewith (in a speciation mode) or bypass the ion-exchange column (in an infusion mode). The further multi-port valve can be fluidly connected with the at least one intermediate multi-port valve and configured to receive the sample from therefrom. The time-of-flight mass spectrometer (TOF-MS) can be fluidly connected to the further multi-port valve.

14 Claims, 18 Drawing Sheets

(51) Int. Cl.
*H01J 49/00* (2006.01)
*H01J 49/04* (2006.01)
*H01J 49/10* (2006.01)
*H01J 49/40* (2006.01)

(52) U.S. Cl.
CPC .......... *H01J 49/045* (2013.01); *H01J 49/105* (2013.01); *H01J 49/40* (2013.01)

(58) Field of Classification Search
CPC ... G01N 2030/8872; G01N 2030/8881; G01N 2030/8886; G01N 27/62; H01J 49/0036; H01J 49/0422; H01J 49/045; H01J 49/105; H01J 49/40
USPC .......................................... 250/281, 282, 288
See application file for complete search history.

(56) References Cited

U.S. PATENT DOCUMENTS

| | | |
|---|---|---|
| 2017/0234780 A1 | 8/2017 | Wiles et al. |
| 2017/0276296 A1 | 9/2017 | Wiederin et al. |
| 2019/0070601 A1* | 3/2019 | Wiederin .................. G01N 1/38 |
| 2019/0079061 A1* | 3/2019 | Unnerstall ............. G01N 30/02 |

* cited by examiner

TRANSFER % RECOVERY OF 5 PPB SPIKED SAMPLE

| CHEMICAL | MATERIAL | ID | TRANSFER DISTANCE (METERS) | TEA | DEAE | TEP | DBP | CTAB | DOP |
|---|---|---|---|---|---|---|---|---|---|
| ISOPROPYL ALCOHOL | FUSED-SILICA | 0.7 MM | 100 | 15.4% | 22.9% | 110.1% | 112.5% | 5.6% | 103.7% |
| ISOPROPYL ALCOHOL | PEEK | 1.0 MM | 100 | 58.7% | 69.2% | 103.8% | 106.7% | 75.5% | 106.5% |
| 90% IPA /10% UPW | PEEK | 1.0 MM | 100 | 81.1% | 85.9% | 103.8% | 102.7% | 83.9% | 105.2% |

INCREASED SAMPLE RECOVERY ACCURACY WHEN IPA WAS DILUTED RELATIVE TO CENTRAL ANALYSIS.

FIG. 4

| SEMI-QUANT EXPERIMENT: PHTHALATES | | | | | | | | |
|---|---|---|---|---|---|---|---|---|
| DBP | | | "SEMI-QUANT" | | DOP | | | "SEMI-QUANT" |
| CONC. (PPB) | DBP COUNTS | CONC. FROM DBP | CONC. FROM DOP | | CONC. (PPB) | DOP COUNTS | CONC. FROM DBP | CONC. FROM DOP |
| 2 | 16538 | 2.49 | 2.16 | | 2 | 19065 | 3.05 | 2.65 |
| 5 | 25226 | 4.42 | 3.85 | | 5 | 27813 | 5.00 | 4.35 |
| 10 | 50185 | 9.98 | 8.68 | | 10 | 55971 | 11.26 | 9.81 |
| 20 | 95731 | 20.11 | 17.51 | | 20 | 109567 | 23.18 | 20.20 |
| SLOPE | 4496.07 | | | | SLOPE | 5158.78 | | |
| X INTERCEPT | 5331.72 | | | | X INTERCEPT | 5385.47 | | |
| $R^2$ | 0.9969 | | | | $R^2$ | 0.9951 | | |

FIG. 5

| SENSITIVITY BY CHEMICAL TYPE-TOF MS | | | | |
|---|---|---|---|---|
| CHEMICAL | PLASTICIZER SENSITIVITY (COUNTS/PPB) DI-BUTYL PHTHALATE | ORGANOPHOSPHATE SENSITIVITY (COUNTS/PPB) TRIETHYL PHOSPHATE | AMINE SENSITIVITY (COUNTS/PPB) BUTYLAMINE | SURFACTANT SENSITIVITY (COUNTS/PPB) SODIUM DODECYLSULFATE |
| IPA | 67300 | 240580 | 107753 | 59952 |
| $H_2O$ | 14579 | 346014 | 117606 | 101207 |
| 35% $H_2O_2$ | 31150 | 321095 | 301025 | 191295 |
| 24.5% HF | 31358 | 80014 | 37892 | 19195 |
| 9.8% $H_2SO_4$ | 14149 | 155885 | 15040 | NOT DETECTED |

SENSITIVITY BY CHEMICAL TYPE-QQQ MS

| CHEMICAL | PLASTICIZER SENSITIVITY (COUNTS/PPB) DI-BUTYL PHTHALATE | ORGANOPHOSPHATE SENSITIVITY (COUNTS/PPB) TRIETHYL PHOSPHATE | AMINE SENSITIVITY (COUNTS/PPB) BUTYLAMINE | SURFACTANT SENSITIVITY (COUNTS/PPB) SODIUM DODECYLSULFATE |
|---|---|---|---|---|
| IPA | 13737 | 45950 | 3615 | 56323 |
| $H_2O$ | 7858 | 35077 | 3380 | 19203 |
| 35% $H_2O_2$ | 11367 | 33935 | 2589 | 21145 |
| 24.5% HF | 2533 | 12274 | 608 | 2567 |
| 9.8% $H_2SO_4$ | 1068 | 22563 | 533 | NOT DETECTED |

MATRIX EFFECTS - SCOUTCARBON TOF

| CHEMICAL | PLASTICIZER PEAK AREA (COUNTS) DI-BUTYL PHTHALATE | ORGANOPHOSPHATE PEAK AREA (COUNTS) TRIETHYL PHOSPHATE | AMINE PEAK AREA (COUNTS) BUTYLAMINE | SURFACTANT PEAK AREA (COUNTS) SODIUM DODECYLSULFATE |
|---|---|---|---|---|
| IPA | 6730020 | 24058014 | 10775264 | 5995243 |
| IPA + MATRIX | 4300372 | 236330664 | 9634459 | 5846951 |
| $H_2O$ | 1457932 | 34601426 | 11760586 | 10120670 |
| $H_2O$ + MATRIX | 1309421 | 30683741 | 10666889 | 9788990 |
| 35% $H_2O_2$ | 3114975 | 32109516 | 30102504 | 19129454 |
| 35% $H_2O_2$ + MATRIX | 3570424 | 28557318 | 30595247 | 20068027 |
| 24.5 %HF | 1651732 | 18648738 | 2782308 | 3066332 |
| 24.5% HF + MATRIX | 24407565 | 24512264 | 777263 | 3437992 |
| 9.8% $H_2SO_4$ | 520875 | 8388078 | 305884 | NOT OBSERVED |
| 9.8% $H_2SO_4$ + MATRIX | 611192 | 103351072 | 295897 | NOT OBSERVED |

FIG. 19

AUTOMATED SYSTEM FOR ONLINE DETECTION OF ORGANIC MOLECULAR IMPURITIES IN SEMICONDUCTOR GRADE CHEMICALS

RELATED APPLICATIONS

This application claims domestic priority to U.S. Provisional Patent Application No. 62/949,411, filed Dec. 17, 2019, and entitled "AUTOMATED SYSTEM FOR ONLINE DETECTION OF ORGANIC MOLECULAR IMPURITIES IN SEMICONDUCTOR GRADE CHEMICALS."

BACKGROUND

Sample introduction systems may be employed to introduce the liquid samples into various analysis equipment such ICP spectrometry instrumentation (e.g., an Inductively Coupled Plasma Mass Spectrometer (ICP/ICP-MS), an Inductively Coupled Plasma Atomic Emission Spectrometer (ICP-AES), or the like), a Time of Flight (TOF) mass spectrometer, a Triple Quad (QQQ) mass spectrometer, other types of sample detectors or analytic instrumentation for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

DRAWINGS

The Detailed Description is described with reference to the accompanying figures. Any dimensions included in the accompanying figures are provided by way of example only and are not meant to limit the present disclosure.

FIG. 4 is a data table indicating the percentage transfer recovery of five parts per billion (5 ppb) spiked sample, performed using a procedure in accordance with an example embodiment of the present disclosure.

FIG. 5 is a data table indicating semi-quantitative experimental results of phthalates, performed using a procedure in accordance with an example embodiment of the present disclosure.

FIG. 15 is a data table showing sensitivity by chemical type analyzed using TOF MS, performed using a procedure in accordance with an example embodiment of the present disclosure.

FIG. 16 is a data table showing sensitivity by chemical type analyzed using QQQ MS.

FIG. 19 is a data table for matrix effects for a series of chemicals analyzed using TOF, using a procedure in accordance with an example embodiment of the present disclosure.

DETAILED DESCRIPTION

Figure 1:
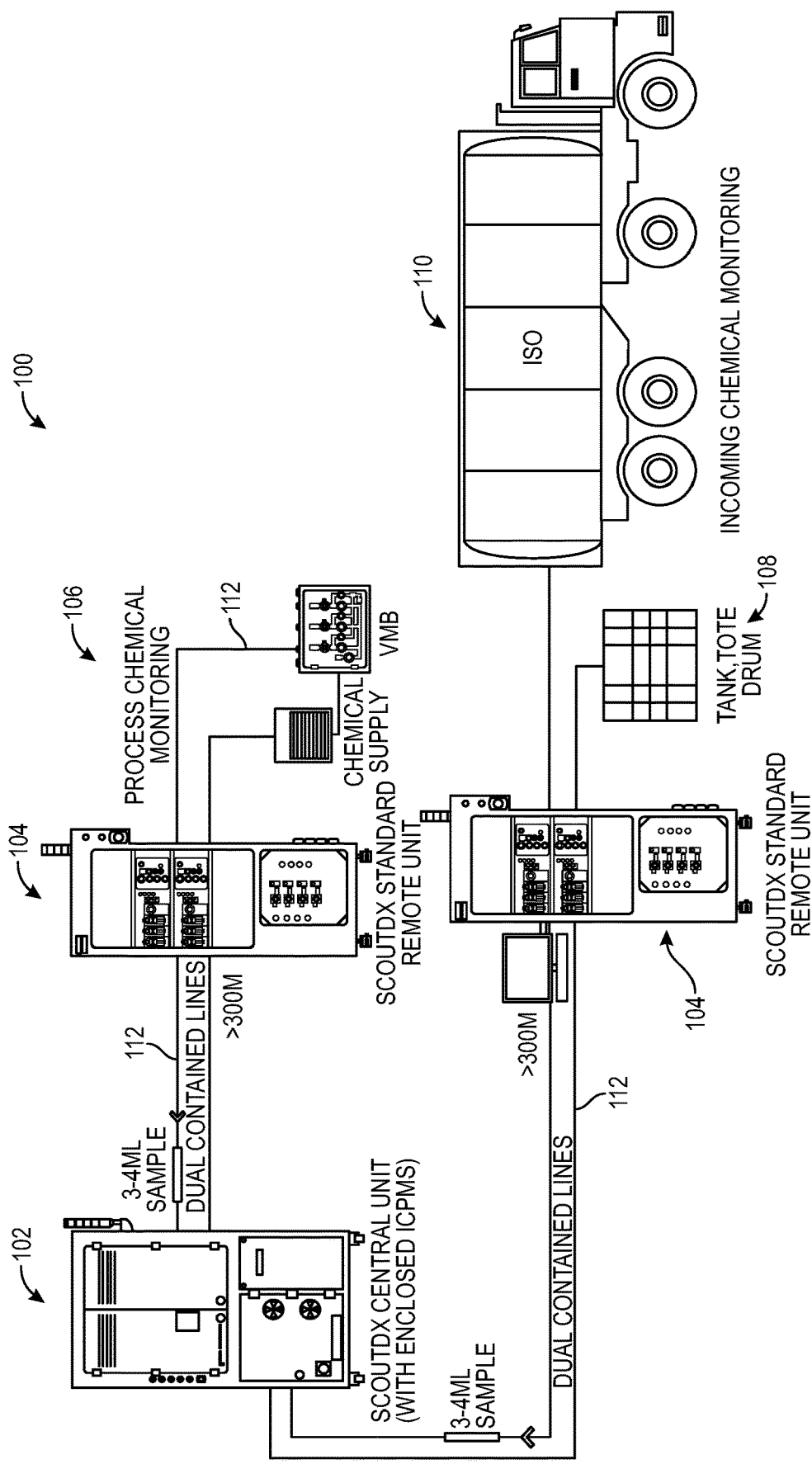
FIG. 1 is a schematic view of an analysis system, according to an example embodiment of the present disclosure.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope.

Overview

Determination of trace elemental concentrations or amounts in a sample can provide an indication of purity of the sample, or an acceptability of the sample for use as a reagent, reactive component, or the like. For instance, in certain production or manufacturing processes (e.g., semiconductor fabrication, pharmaceutical processing, etc.), the tolerances for impurities can be very strict, for example, on the order of fractions of parts per billion. For example, semiconductor processes can require the detection of organic molecular impurities in process chemicals. Failure to detect impurities in such process chemicals can reduce the quality of the process and possibly even ruin a semiconductor wafer.

Various types of organic molecular contaminants may adversely affect semiconductor processing. Plasticizers, such as di-butyl phthalate and di-octyl phthalate, can slow silicon dioxide growth. Organophosphates may cause unintentional doping. Amines can neutralize photo-generated acids. Antioxidants, such as butylated hydroxytoluene and butylated hydroxyanisole, can degrade gate-oxide constructs on a wafer. Surfactants, such as cetrimonium bromide and sodium dodecylsulfate, can add hydrophilicity to wafers.

Further, in liquid chromatography mass spectrometry (LC-MS), it is considered best-practice to use volatile additives. Non-volatile additives have been shown to precipitate salts in the ion source and suppress signal. Even worse, inorganic acids can be corrosive to the stainless-steel components commonly found in LC-MS sample ionization. Further, high concentrations of mineral acids are commonly considered to be incompatible with electrospray ionization mass spectrometry (ESI-MS) due their nonvolatility and potential harm to the sample introduction parts. By selectively removing the anions of the mineral acids, other components of the matrix may be analyzed. These considerations have given rise to methods of sulfate removal from a sample, including the use of anion exchange chromatography for such a purpose. The removal of the sulfates can improve the ability of the system to detect organic additives.

Accordingly, the present disclosure is directed to systems and methods for automated, online detection of organic molecular impurities in a chemical sample such as a sample of semiconductor grade chemicals.

The present system can employ one or more remote sampling and preparation modules using pneumatic transfer to a central detection apparatus, such as a mass spectrometer or the like, capable of detecting organic analyte impurities in a sample by producing and detecting molecular ions or molecular ion fragments from one or more of the impurities. In embodiments, the ion source is an electrospray, and the detection apparatus includes a mass spectrometer (MS), such as a Time of Flight (TOF) mass spectrometer or a Triple Quadrupole (Triple Quad or QQQ) mass spectrometry instrument. In an embodiment, the present system can employ a gas chromatography-mass spectrometry (GC-MS) analysis unit (e.g., alone or in conjunction with other analysis units). The one or more remote sampling and preparation modules may be placed at various sampling points in the manufacturing facility and can be sampled and analyzed in order or randomly accessed for analysis. In an embodiment, up to 40 remote sampling points can be sampled and analyzed using a central analyzer unit. In an embodiment, an organic-based wash solution can be used (e.g., in the lines and/or any columns), as organic solvents (methanol, isopropyl alcohol, etc.) tend to dissolve organic compounds better than water. Organic compounds are generally relatively non-polar, so they are less likely to be soluble in water.

In embodiments, the system can operate in at least two modes. For example, in a first mode the system directly infuses the sample to the ion source without chromatographic separation from the sample matrix or other impurities from the analyte. In an embodiment, the infusion mode is high speed process that can be used for direct analysis of a given chemical. For example, the infusion mode can use TOF contaminant identification by accurate m/z (mass to charge ratio) or QQQ contaminant identification by accurate m/z and fragmentation.

In the second mode, or speciation mode, the analyte is first partially or completely separated from the sample matrix or other sample component using chromatography. In an embodiment, the speciation mode can confirm a chemical composition through a combination of retention time via chromatography (i.e., time retained in an ion-exchange column) and an accurate m/z measurement via TOF-MS and may do so with very low detection limits. In an embodiment, the speciation mode can result in the elimination of matrix-induced suppression. In embodiments, speciation of multiple organic contaminants can facilitate a fully automated organic impurity monitoring system and can provide near-real time monitoring for each chemical. In embodiments, speciation can yield sub-parts-per-billion (sub-ppb) detection limits for most organic contaminants. In embodiments, the selection of secondary analysis in speciation mode is made based on initial data from the infusion mode analysis. In embodiments, the system can be calibrated using method of standard addition. The system can be calibrated using external calibration with offset factors to adjust for sensitivity of the infused sample.

In embodiments, each of the remote samples can be directed to a plurality of mass spectrometers to provide complementary information, such as detection of one or more known analytes using TOF and identifying any unknown analyte using QQQ-MS.

In one aspect, the present disclosure relates to remote sample preparation, system component materials, and/or methods of system washing. In an embodiment the present system can be configured to incorporate multiple remote sampling points (e.g., up to 40) to monitor many chemicals with one mass spectrometer. In an embodiment, one or more transfer lines made of particular materials may be employed, such as a fluoropolymer tubing for the testing for metal components; or PEEK (Polyetheretherketone) or fused silica tubing for the testing of organics, thereby minimizing any potential adverse effects the transfer line material may have on testing for a particular material class. In an embodiment, organic washing (e.g., methanol, isopropyl alcohol, etc.) of the transfer and/or central lines and/or any cleaning columns can be employed, as organic solvents tend to dissolve organic compounds better than water. In an embodiment, the present system can mitigate ionization suppression in mineral acids and thereby improve the detection of organic contaminants in online monitoring. In an embodiment, the present system can be configured for automated washing of pneumatic transfer lines after chemical transfer to prevent cross contamination. The connections associated with the present system can accommodate remote units being 300 meters (m) or more from the central analyzer of the system.

In one aspect, the present disclosure relates to software implemented in conjunction with the present system. In an embodiment, the software can import m/z (mass to charge ratio) data for organics (e.g., both expected and unexpected components and/or contaminants), thereby facilitating testing for a greater range of materials/components. The mass spectrometry instrument may only detect ions, not neutrally charged compounds. The m/z refers to the observed ion mass for a specific compound and its connected charge carrier. For example, $C_3H_9N$ may be observed as $(C_3H_9N)H+$ by the instrument at +60.0808 since that compound (plus the H) has a mass of 60.0808 and a charge of +1. In an embodiment, m/z detection can be used for to locate previously unobserved compounds and thereby automatically detect such compounds. In an embodiment, the software can be configured to automatically assign a chemical formula based on high-resolution mass (±0.0001 amu) spectrometry, thus facilitating identification of unknown contaminants.

In an embodiment, the software can be programmed and otherwise configured to simultaneously detect for multiple organic contaminates and/or components. In an embodiment, the software can be configured to perform a semi-quantitative test (e.g., an estimation) for unknown contaminates. In an embodiment, the software can be configured to classify one or more, for example, unknown organic components (e.g., by formula) into a specific class and compare against a compound from the same class. In an embodiment, the software can be programmed and configured for a semiquantitative calibration for unknown contaminant using a high-resolution m/z formula to classify the compound into a class because compounds in a class (e.g., amines) tend to have similar ionization potential. In an embodiment, the software can be configured to express unknown compounds as a percentage deviation from the baseline, with, for example, the detection of an uncalibrated organic contaminant and expression of semiquantitative intensity thereof by a deviation from a previous baseline.

Further aspects of the present disclosure can relate to the implemented software. In an embodiment, the software can be configured to account for polarity (e.g., facilitating testing for metallics and/or organics). In an embodiment, the software for the central analyzer can be programmed and configured to automatically select a given transfer line for organic contaminants or metal contaminants (e.g., sending one portion to an organic MS and another portion to an ICPMS for metals detection and particle detection). In an embodiment, the software can automatically determine if the contaminant is known (observed before) or a new contaminant and, further optionally, automatically add any newly observed and identified contaminant/material to a given database or library.

In one aspect, the present disclosure relates to autocalibration and/or autodilution at the central analyzer of the present system. In an embodiment, the central analyzer is configured to auto-calibrate organic compounds simultaneously using inline syringe dilution for electrospray mass spectrometer. In an embodiment, automatic external calibration can be employed, for example, using an inline syringe dilution. In an embodiment, metals and organics can be analyzed for with the same sampling system. In an embodiment, the simultaneous detection of organic and metal contaminants can be achieved using auto-sampling to two different mass spectrometers (e.g., as part of the central analyzer). In an embodiment, a given sample can be diluted using flow injection (e.g., 4 µL dilution with carrier). In an embodiment, the central analyzer can be configured to auto spike a sample using a method of standard addition (MSA) to compensate for different chemical matrices. In an embodiment, the central analyzer can be configured to auto spike a sample that have one or more analytes out of range to bring the sample into range (e.g., with water, methanol, IPA (isopropyl alcohol), or another chemical). In an embodiment, remote sample preparation system can be used for maintaining sensitivity and transport efficiency, for example, by diluting the sample at the remote with water or another chemical (e.g., by 10% volume-wise) to improve transfer and recovery of organic contaminants. In an embodiment, the present system can be configured for auto spiking of reference accurate mass correction calibration standards into samples and sensitivity standards for each compound analytical response (sensitivity) calibration. In an embodiment, such a step can be achieved using one nebulizer for both sample and mass calibration standard introduction. In an embodiment, such a step can yield 2-10 times greater measurement sensitivity than previously achievable. In an embodiment, the central analyzer can be configured to express a change in organic sensitivity as a percent change from a set baseline.

In one aspect, the present disclosure relates to sample preparation performed by the present system. In an embodiment, chemical introduction can be controlled. In an embodiment, ion-exchange columns (e.g., one or more high-performance liquid chromatography (HPLC) columns) for both organic and mineral solvents (e.g., tetramethylammonium hydroxide (TMAH) and sulfuric acid) may be employed. In an embodiment, the present system can be configured to define a difference between mass-accurate reference ions and compound calibration. In an embodiment, the central analyzer may use one nebulizer (as part of the TOF-MS) for both mass correction and sample introduction. In an embodiment, the central analyzer can be configured to selectably choose between infusion or speciation modes, where no speciation column is used in during an infusion mode and a speciation column is used in a speciation mode. In an embodiment, a platinum (Pt) nebulizer can be employed as part of the TOF-MS/central analyzer (e.g., inert nature of Pt, even at high temperatures, helps ensure that no additional contaminants may be introduced via use of the nebulizer). In an embodiment, positive and negative compounds can be selectively analyzed using the present system.

Example Embodiments

Figure 2:
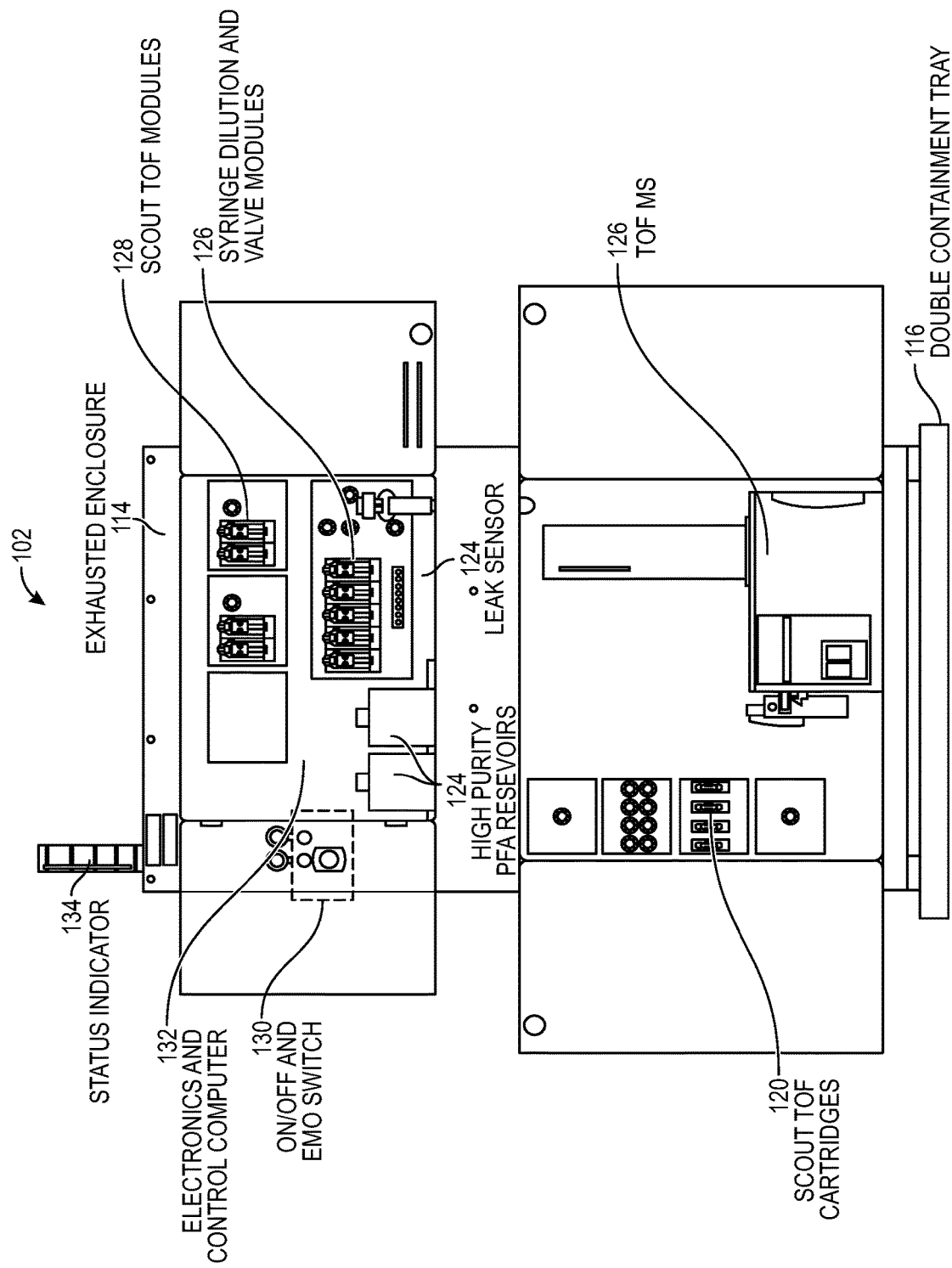
FIG. 2 is a schematic, front view of a central analyzer unit of the analysis system of FIG. 1.

FIG. 1 generally illustrates an analysis system 100 configured to analyze samples transported over long distances, in accordance with an example embodiment of the present disclosure. The analysis system 100 can include, for example, a central analyzer unit 102, a plurality of remote units 104 (e.g., a remote sample preparation unit), a chemical supply and monitoring unit 106, a large fluid container 108 (e.g., a tank, tote, or drum), an incoming chemical monitoring vehicle 110, and a plurality of fluid lines 112 to facilitate fluid interconnects between the various units. FIG. 2 generally illustrates the central analyzer unit 102 in greater detail. The central analyzer unit 102 can include, for example, an exhausted enclosure 114, a double containment tray 116, a TOF MS unit 118, a plurality of TOF cartridges 120, a plurality of reservoirs 122 (e.g., made of a high-purity fluoropolymer such as high-purity perfluoroalkoxy alkane (PFA)), at least one leak sensor 124, a plurality of syringe dilution and valve modules 126, a plurality of TOF modules 128, an on/off and emergency off (EMO) switch 130, an electronics and control computer 132, and a status indicator 134 (e.g., a multi-color light). The analysis system 100 can be configured to analyze for organic compounds (e.g., organic contaminants) and may be further configured to analyze for metals or mineral components (e.g., metallic contaminants). In an embodiment, the analysis system 100 can be configured to access multiple remote sampling points (e.g., remote units 104) to monitor many chemicals with one mass spectrometer (e.g., TOF MS unit 118). In an embodiment, a given remote unit 104 can be configured to sample a given chemical to be tested and/or to prepare the sample for testing (e.g., adjust the concentration, introduce a diluent, and/or provide an internal standard). In an embodiment, the present analysis system 100 may be known by the Applicant as a "Scout Carbon" analysis system or simply as a "Scout" analysis system.

Figure 3:
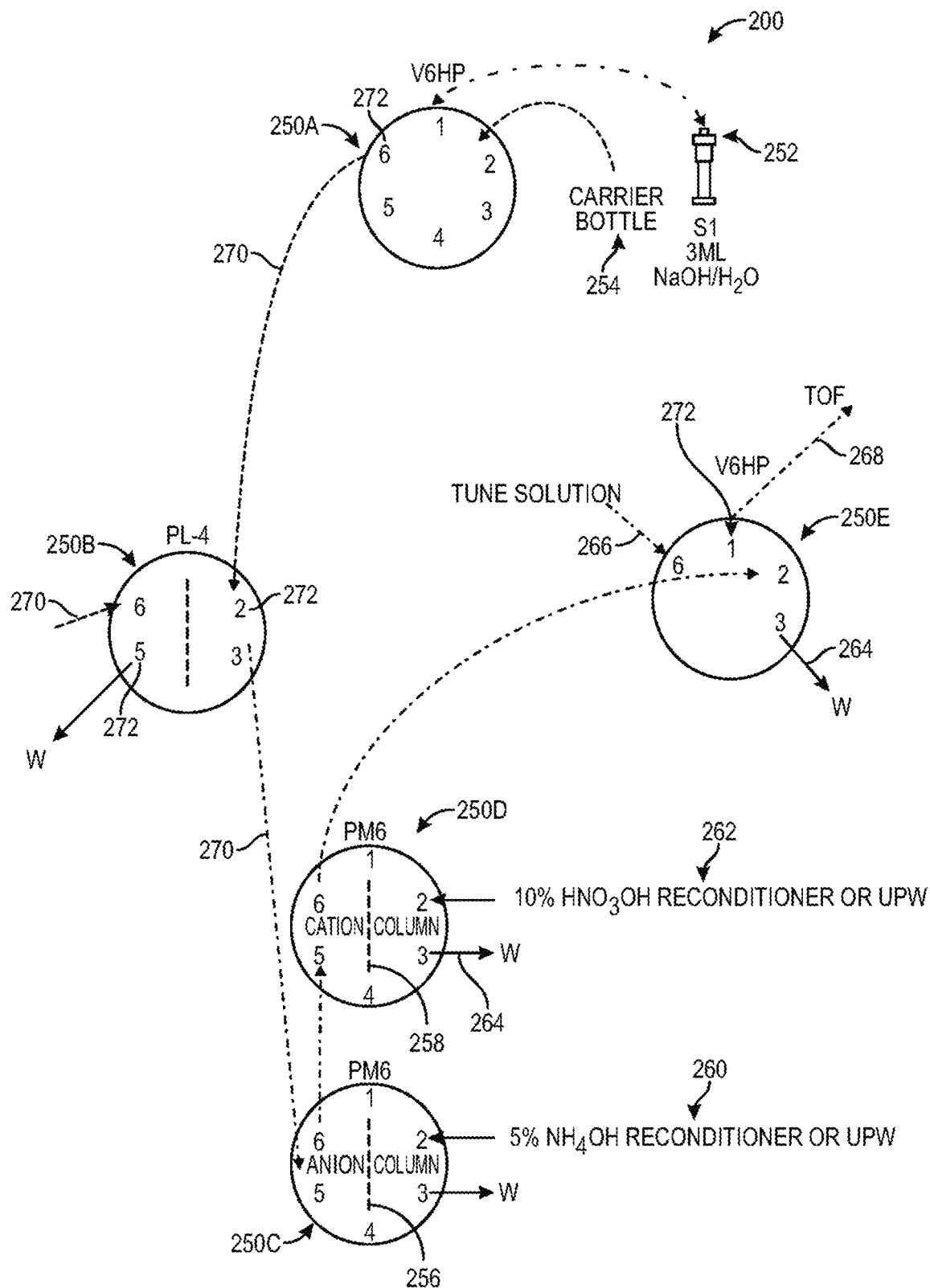
FIG. 3 is a partial schematic view of an analysis system, selectably used in an infusion mode or a speciation mode, according to an example embodiment of the present disclosure.

In accordance with an embodiment of the present disclosure, an analysis system 200 (e.g., used as part of and/or in conjunction with a central analyzer unit) can operate in at least two modes, an infusion mode and a speciation mode, as illustrated using FIG. 3. To facilitate its use in the two modes, in an embodiment, the analysis system 200 can include a plurality of multi-port valves 250A-250E, at least one sample source 252, at least one carrier bottle 254, an anion exchange column 256, a cation exchange column 258, a first cleaning fluid source 260 (e.g., 5% (by weight) $NH_4OH$ reconditioner, another basic solvent, or ultra-pure water (UPW)), a second cleaning fluid source 262 (e.g., 10%

(by weight) $HNO_3$ reconditioner, another acidic solvent, or UPW), one or more waste (W) locations 264, a tune solution source 266, a TOF-MS 268, and a plurality of fluid lines 270, as needed, to provide fluid interconnects between the multi-port valves 250A-250E and/or the other system components. Each of the multi-port valves 250A-250E can include a plurality of individual ports 272 (e.g., 4-6 ports 272), allowing fluid flow to be directed through, into, or out of a given multi-port valves 250A-250E. In an embodiment, multi-port valves 250A and 250E may be V6HP valves, multi-port valve 250B may be a PL-4 valve, and multi-port valves 250C and 250D may be PM6 valves. Multi-port valves 250C and 250D may be considered to be positioned intermediate the multi-port valve 250B and the multi-port valve 250E, and the multi-port valve 250E may be considered the final multi-port valve, given its connection with the TOF-MS 268 (e.g., the termination of the flow path for a given sample).

In operating in a speciation mode, in which an analyte is first partially or completely separated from the sample matrix or other sample component using chromatography, the ion-exchange columns (e.g., the anion exchange column 256 and the cation exchange column 258) are employed to remove a matrix material (e.g., an acid such as sulfuric acid or a base such as TMAH) from the sample prior to directing a sample to the TOF-MS 168. In the case of either matrix material, a sample (e.g., a 4 μL sample) can be loaded into a multi-port valve 250B and then pushed into the multi-port valve 250C. For an acid matrix, such as sulfuric acid, the sample can be pushed inline through the anion exchange column 256 carried with the multi-port valve 250C, directed to bypass the cation exchange column 258 when traveling through the multi-port valve 250D, and then delivered to the TOF-MS 268, via the multi-port valve 250E. For a basic matrix, such as TMAH, the sample is pushed through the multi-port valve 250C, bypassing an inline anion exchange column 256 associated therewith, and directed into the multi-port valve 250C and its cation exchange column 258, before going to the TOF-MS 268, via the multi-port valve 250E.

A system flush or clean may be performed periodically or after each use of a given ion exchange column 256, 258. The UPW or an appropriate reconditioner may be used to flush one or more of the fluid lines and/or a given ion exchange column 256, 258. For example, UPW and/or an acid reconditioner may be used to clean, flush, and/or otherwise recondition the cation exchange column 258 and/or the multi-port valve 250D, while a basic reconditioner may be used to clean, flush, or otherwise recondition the anion exchange column 256 and/or the multi-port valve 250C.

In an embodiment, an organic wash, UPW, or another fluid (e.g., solvent) may be used to flush and clean any of the various fluid-channeling components (e.g., fluid lines 112, 270; and/or multi-port valves 250) of the analysis system 100, 200. The analysis system 100, 200 can be configured to automatically wash pneumatic transfer lines after chemical transfer to prevent cross contamination. In an embodiment, the analysis system 100 can use an organic wash to automatically clean the transfer & central lines (e.g., 112, 270). In an embodiment, the sample can be loaded into a loop (e.g., 18 mL) and transferred from a given remote unit 104 to the central analyzer unit 102, using pneumatic transfer lines (e.g., 112, 270). Once the sample is done transferring, the same loop can be provided (e.g., filled) with an organic wash solution (e.g., 18 mL), with that organic wash solution then transferred through the same pneumatic transfer line(s). Finally, the organic wash solution can be rinsed out by transferring a similar amount (e.g., 18 mL) of UPW therethrough.

When operating in an infusion mode, the sample can be delivered from the multi-port valve 250B and through the multi-port valves 250C, 250D and not pass through either exchange column 256, 258, before ultimately reaching the TOF-MS 268, via the multi-port valve 250E. In an embodiment, the sample can be directly delivered from the multi-port valve 250B to the multi-port valve 250E, when being tested using the infusion mode (e.g., completely bypassing the multi-port valves 250C, 250D).

In an embodiment, automated software can used when analyzing using the infusion mode. The computer 132 or other control unit for the central analyzer unit 102 can be programmed and configured to automatically imports the data file from TOF-MS, extracts the m/z and their respective intensities, and displays these values for the user to see. In an embodiment, the software may be programmed to facilitate a simultaneous detection of a plurality of organic contaminants or other components. In an embodiment, the software can use m/z detection to deal with unobserved compounds, thereby allowing such previously unobserved compounds to be automatically detected. The software can automatically determine if the contaminant is known (observed before) or a new contaminant. If a new contaminant, the software can be configured to automatically add it to the SECS-GEM (SECS (SEMI Equipment Communications Standard)/GEM (Generic Equipment Model) report or a materials library, for example.

In an embodiment, the software associated with the present analysis system (e.g., residing in the computer 132 of system 100) can be configured to perform a semi-quantification calibration for unknown contaminant using infusion mode. The TOF MS unit 118 can generate high-resolution masses (+/−0.0001 amu). Using this high-resolution mass, a molecular formula can be calculated and assigned to the m/z value observed. An algorithm can be used to classify these generated molecular formulas for semi-quantification (also referred to "semi-quant"). These generated molecular formulas can then be classified based on molecular features, such as containing specific elements (e.g. N, Cl, P, or S), or fitting a specific molecular formula pattern e.g. ($C_{n+8}H_{2n+6}O_4$ where n>0. n=2 results in $C_{10}H_{10}O_4$).

Similar compounds within a class have been observed to ionize in similar (but not exact) intensities per part-per-billion. That is why this technique is a semi-quant technique. For example, amines can ionize using ESI-MS similar to other amines, and organo-phosphates ionize using ESI-MS similar to other organo-phosphates, but amines may not ionize similar to organo-phosphates. Each class can have at least one standard compound that is quantified using auto-dilution and auto-calibration capabilities of the present analysis system 100. All other compounds in a class can be calibrated according to this/these standard compounds. If a compound falls into multiple classes, then a semi-quantification concentration range may be suggested.

In an embodiment, semi-quantification may be achieved using a set of steps. First, a known organic compound for a class can be calibrated using auto-dilution and auto-calibration at an organic-based central analyzer unit 102 (e.g., establishing a Class X). Then, a calibration curve can be auto-generated and the linear slope and Y-intercept values ($R^2$>0.995) can be determined. Next, a new sample can be run and observed for its unknown m/z value. A mass-accurate molecular formula can be generated based on high-resolution mass of the unknown m/z. The m/z can be classified based on molecular formula in accordance with the software (e.g., Class X). The Class X standard slope and Y-intercept values can be applied to obtain a semi-quantified concentration of unknown m/z. Finally, the semi-quant concentration can be reported in the software (e.g., for display and/or for storage in a data library).

Figure 6:
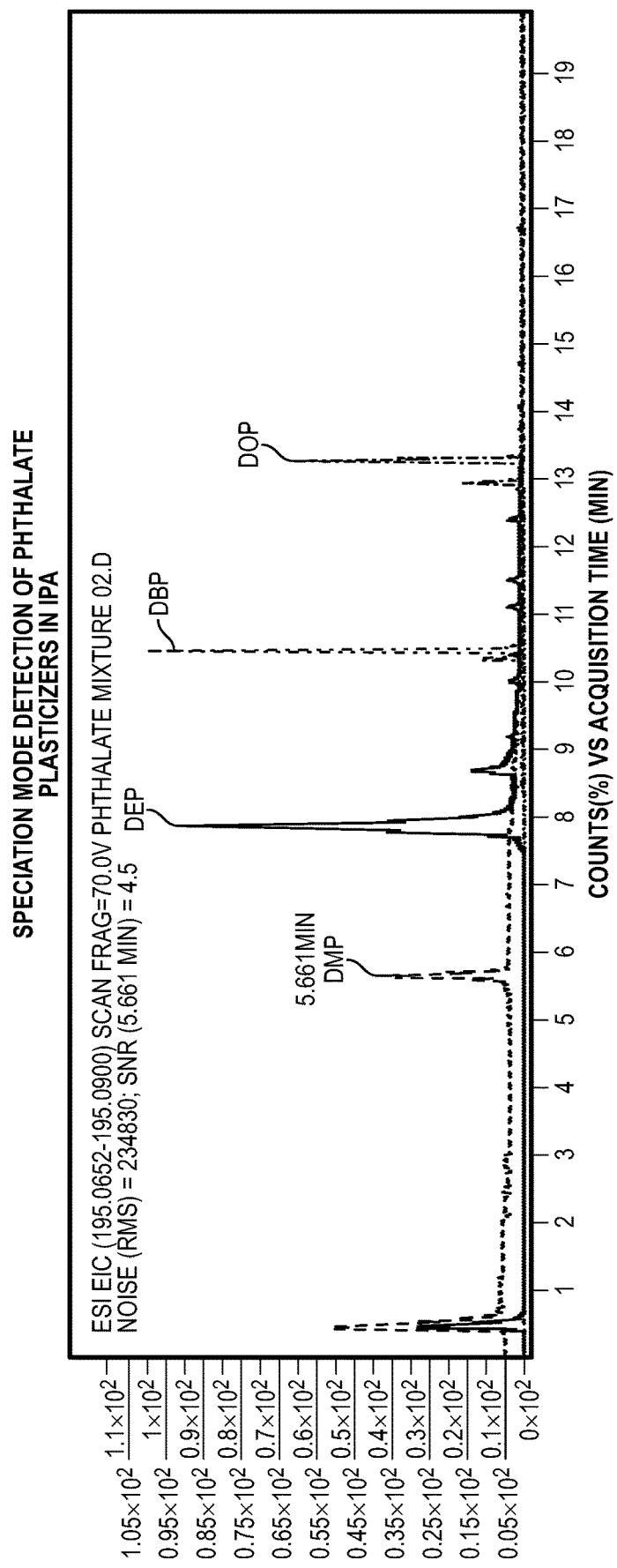
FIG. 6 is a data plot in terms of percentage counts over time for speciation mode detection of phthalate plasticizers in isopropyl alcohol (IPA), performed using a procedure in accordance with an example embodiment of the present disclosure.
Figure 7:
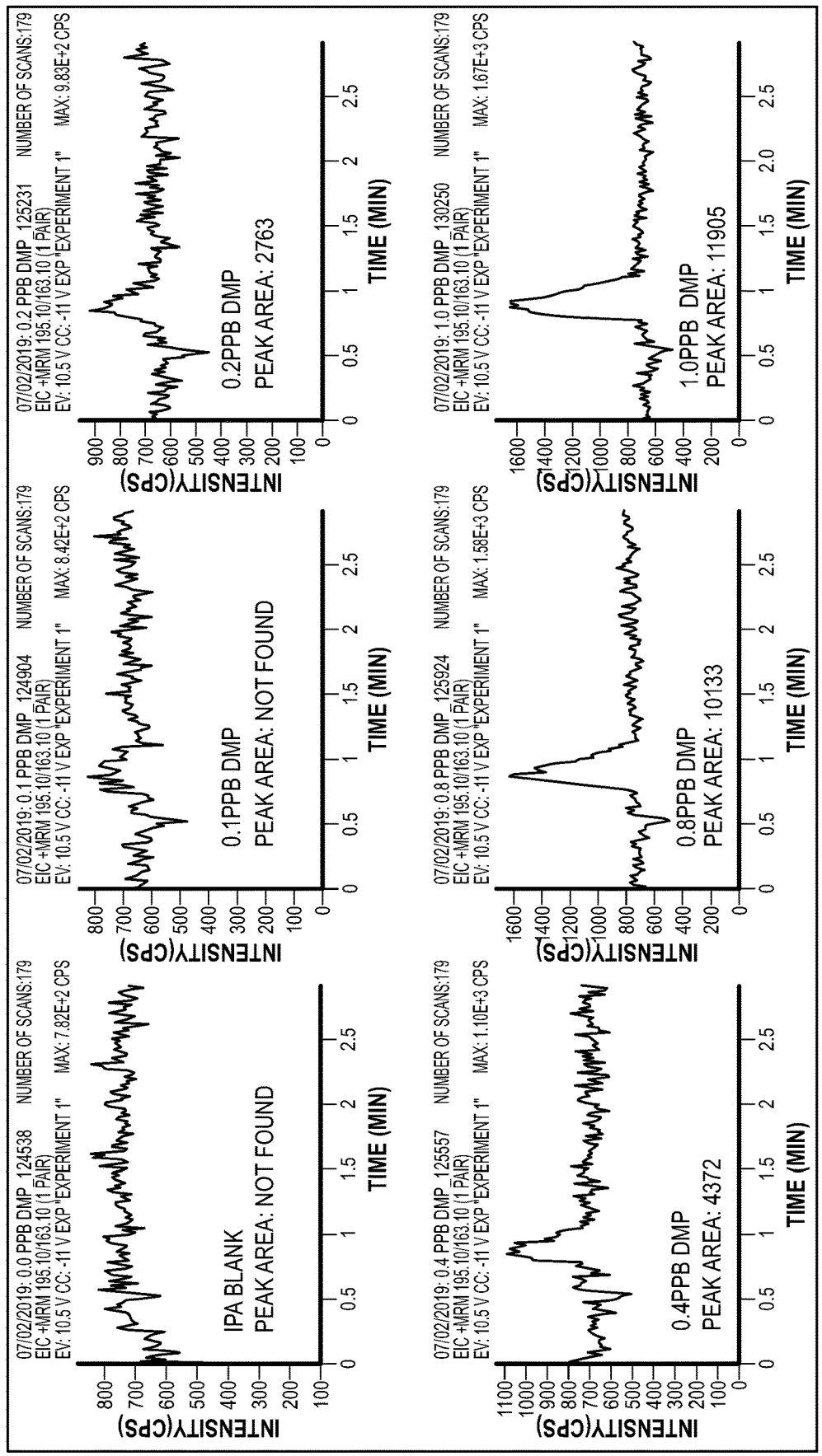
FIG. 7 is a series of data plots for speciation mode detection of sub-ppb phthalate, performed using a procedure in accordance with an example embodiment of the present disclosure.

In an example, the semi-quant process has been used to identify Dibutyl Phthalate "DBP" ($C_{16}H_{22}O_4$) and Dioctyl Phthalate "DOP" ($C_{24}H_{38}O_4$). The analysis system 100 classified both as "phthalates" based on generated molecular formula. Each was run on a calibration curve, then the intensity (counts) of each one was applied to the other's calibration curve to a high degree of accuracy for concentration. It is to be understood, however, that dibutyl phthalate could have been quantified with high success using dioctyl phthalate's calibration curve and vice versa. FIG. 5 shows a table of data associated with such an experiment. FIGS. 6 and 7 show plots associated with speciation mode detection of phthalates.

In an embodiment, a given remote sample preparation unit 104 can be configured to dilute a given sample at the given remote sample preparation unit 104 with water (e.g., UPW) or another chemical (e.g., solvent) to improve sample transfer and recovery of any organic components/contaminants. In an embodiment, the dilution can be in the range of 5-15% (by volume), up to 10% (by volume), or by 10% (by volume). In an embodiment, the analysis system 100 can be configured to automatically prepare a sample at the given remote sample preparation unit 104 based on the matrix to ensure high transfer recovery of organic contaminants. Certain chemicals have been found to perform better when diluted with another chemical. This dilution step can be automatically performed at the remote 104, with no manual preparation of the sample before transfer. For example, isopropyl alcohol (IPA) shows higher pneumatic transfer recovery when diluted to 90% (by volume), with the remaining 10% being UPW. FIG. 4 provides data indicating the improved recovery achieved, relative to the transfer percentage of a 5 parts per billion (ppb) spiked sample, when using diluted IPA.

In an embodiment, the present analysis system 100 can be configured such that a given remote sample preparation unit 104 can selectively transfer a sample to chosen one of a plurality of central analyzer units (e.g., 102), for example, to test for organic contaminants or metal contaminants. In an embodiment, one portion of a sample can be sent to an organic MS and another portion can be sent to an ICPMS for metals detection and/or particle detection. To facilitate such a selective transfer, differently composed transfer lines (e.g., 112, 270) may be needed, given the type of testing to be performed at a given central analyzer unit 102. For example, an organic-focused central analyzer unit 102 (such as a "ScoutCarbon" central) can have transfer lines (e.g., 112, 270) associated therewith (e.g., internally, incoming, or exiting) that are made of a material such as PEEK or fused silica. For example, a metal/particle-focused central analyzer unit 102 (e.g., a "ScoutDX" or a "ScoutNano" central) can have transfer lines (e.g., 112) associated therewith that are made of a fluoropolymer material. In an embodiment, to aid in such a selective transfer, a given remote sample preparation unit 104 can be provided with an additional multi-port valve (e.g., an ESI "P3" valve) to select the transfer location (e.g., which central) and thereby direct a given sample or sample portion through an appropriately composed transfer line (e.g., 112). For example, when the multi-port valve is placed in a "load" position, it can connect with one transfer line (e.g., a fluoropolymer line leading to a central using an ICPMS). Further with that example, when the multi-port valve is switched to an "inject position," it can connect with the other transfer line (e.g., a PEEK line leading to a central using an organic MS).

In an embodiment, the software associated with the present analysis system 100 (e.g., such as programmed within the computer 132) can be configured to detect a polarity (e.g., positive or negative, as the case may be) of the one or more components (e.g., contaminants) for which the system 100 is testing. In an embodiment, compounds can be observed as a positive ion or a negative ion, and the software can be able to know the difference based on the data from the TOF-MS unit 118. The standard report can be modified the report to be able to permit outputting the polarity of a given component, using a custom formula.

Figure 8:
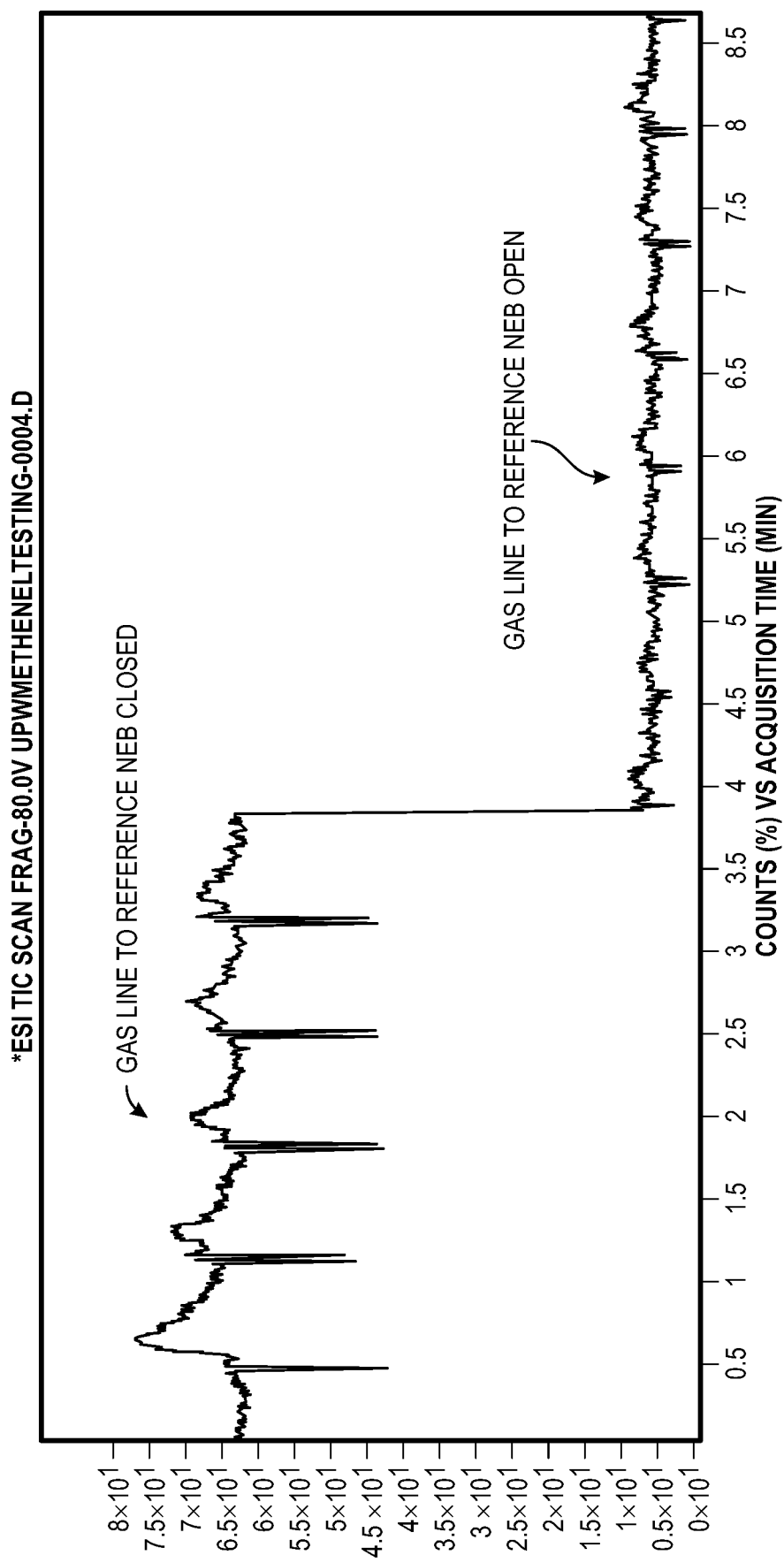
FIG. 8 is a set of comparative plots indicating the results with the gas line to the reference nebulizer open and with it closed, performed using a procedure in accordance with an example embodiment of the present disclosure.

In an embodiment, the present analysis system 100 can be configured for autocalibration and/or autodilution at the central analyzer unit 102. Auto spiking of a reference can yield accurate mass correction calibration standards into samples and sensitivity standards for each compound analytical response (sensitivity) calibration. In an embodiment, one nebulizer (e.g., associated with a TOF MS unit 118) can be used for both sample and mass calibration standard introduction, which can improve sensitivity, for example, by a factor of two to ten times. Traditional use of an Agilent TOF-MS is to use the $2^{nd}$ nebulizer to introduce the reference mass correction calibration standards into the electrospray (ESI-MS). In a present embodiment, those standards are being spiked into a sample and introduced through the same nebulizer. By doing this, the sensitivity has been increased by not using and closing off the gas flow to the $2^{nd}$ nebulizer. This differential is illustrated in the plot of counts (%) versus time (min) shown in FIG. 8.

In an embodiment, auto spiking of a sensitivity calibration standard (MSA) or a single spike into each sample or standard can be employed. Auto spiking using a method of standard addition (MSA) can be used to compensate for different chemical matrices. Calibration curves can be automatically made in the sample itself, which can make calibrating in difficult matrices possible. This system can automatically spike in different amounts of the calibration standard into the collected sample to create a calibration curve. Compounds that have a calibration curve prepared in the calibration tab can show up with concentrations, when presented by the analysis system 100. As such, no manually made calibration samples need be generated.

In an embodiment, auto dilution of sample which has one or more analytes out of range can be used to bring the analyte into a calibration range for accurate quantification. For example, IPA can be diluted with UPW or another chemical to bring the saturating analyte into range. In an embodiment, software may warn the user when a specific m/z has saturated the detector and automatically rerun that sample at a dilution. Software can automatically account for this dilution when calculating concentrations. In an embodiment, the software may be able to set specific masses to which to apply this rule or set the software to be applied to all the masses detected. In an embodiment, the data report display may indicate that such a rule has been triggered and that a rerun has been performed.

Figure 9:
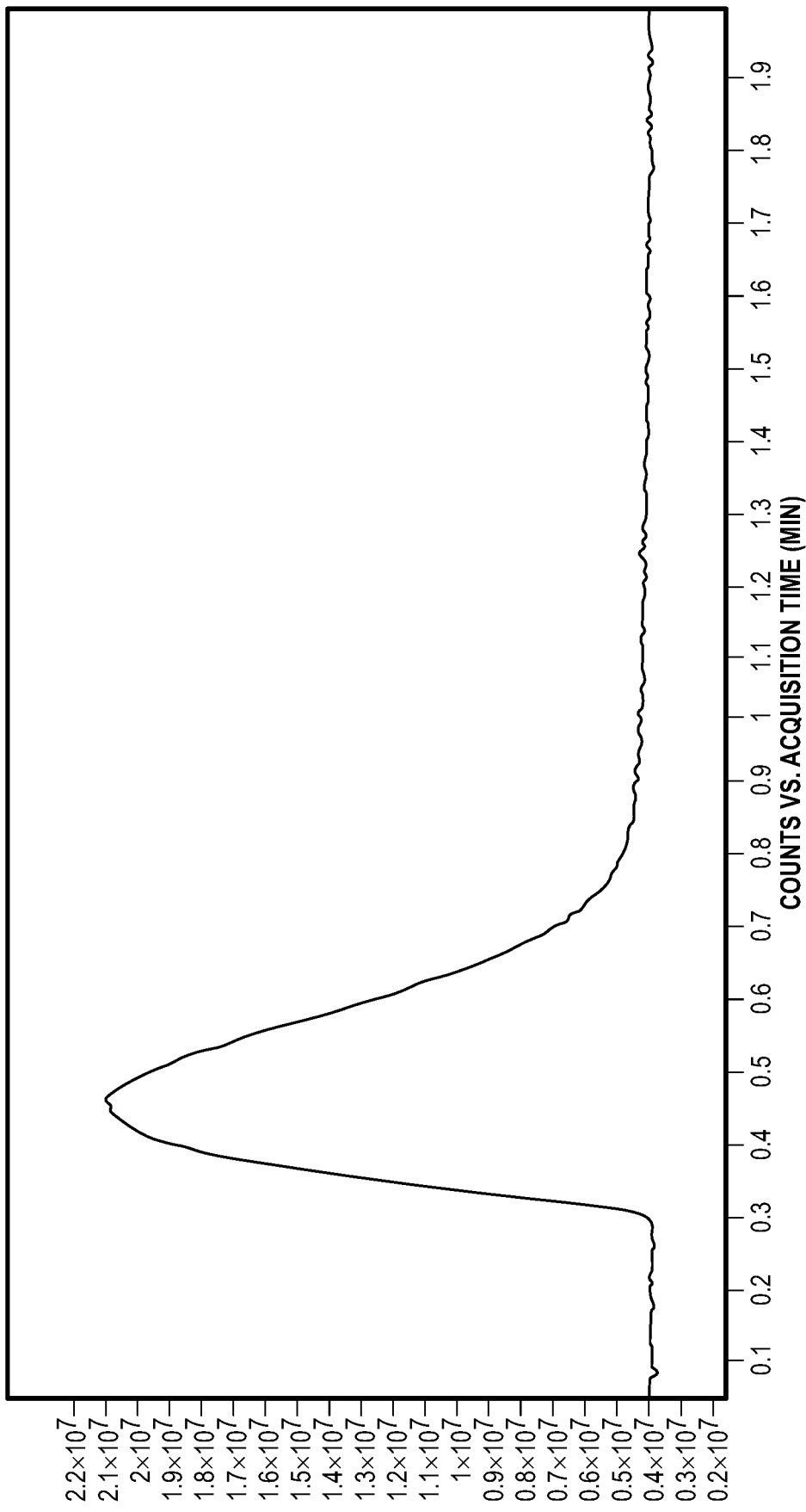
FIG. 9 is a plot of counts versus acquisition time, performed using a procedure in accordance with an example embodiment of the present disclosure.

In an embodiment, the software can be programmed and configured to automatically and externally calibrate an organic mass spectrometer (e.g., a TOF-MS), using inline syringe dilution for an electrospray mass spectrometer. The software can be configured to create an external calibration automatically of one standard solution. The software can cause the analysis system 100 to automatically dilute the sample inline and create a calibration curve. In an example process, a sample can be diluted by flow injection (e.g., 4 µL dilution with a carrier) and used in conjunction with an infusion mode step. In an embodiment, the sample can be caught in a multi-port valve that has an internal channel. This channel can have a volume of approximately 4 (e.g., a PL-4 valve). When the valve switches, this sample is pushed inline with an organic/aqueous carrier solution. By the time the sample reaches the TOF-MS, it has mixed with the carrier on the front and back ends of the sample. This gives a characteristic "peak" shape that can be automatically analyzed when doing infusion mode, such as that illustrated in FIG. 9. That peak can then be analyzed for organic contaminants or other components, for example, and the data reported via the software (e.g., to a display and/or a data library).

In an aspect of the present disclosure, detection of an uncalibrated organic contaminant and expression of semi-quantitative intensity can be achieved based on a measured deviation from a previous baseline. In an embodiment, unknown compounds can be expressed as a percentage deviation from a given baseline. One way to compare two different samples of the same chemical can be to subtract each m/z's intensity from a baseline standard. This comparison can be used to create a data plot that can quickly show what m/z values are found in a sample that are not found in the baseline. In an embodiment, these values can be expressed as a numeric change (i.e., the sample intensity less the baseline intensity). In an embodiment, these values can be expressed as a percentage deviation from the baseline (i.e., Sample Intensity−Baseline Standard intensity/Baseline Standard Intensity×100=% change).

Figure 10:
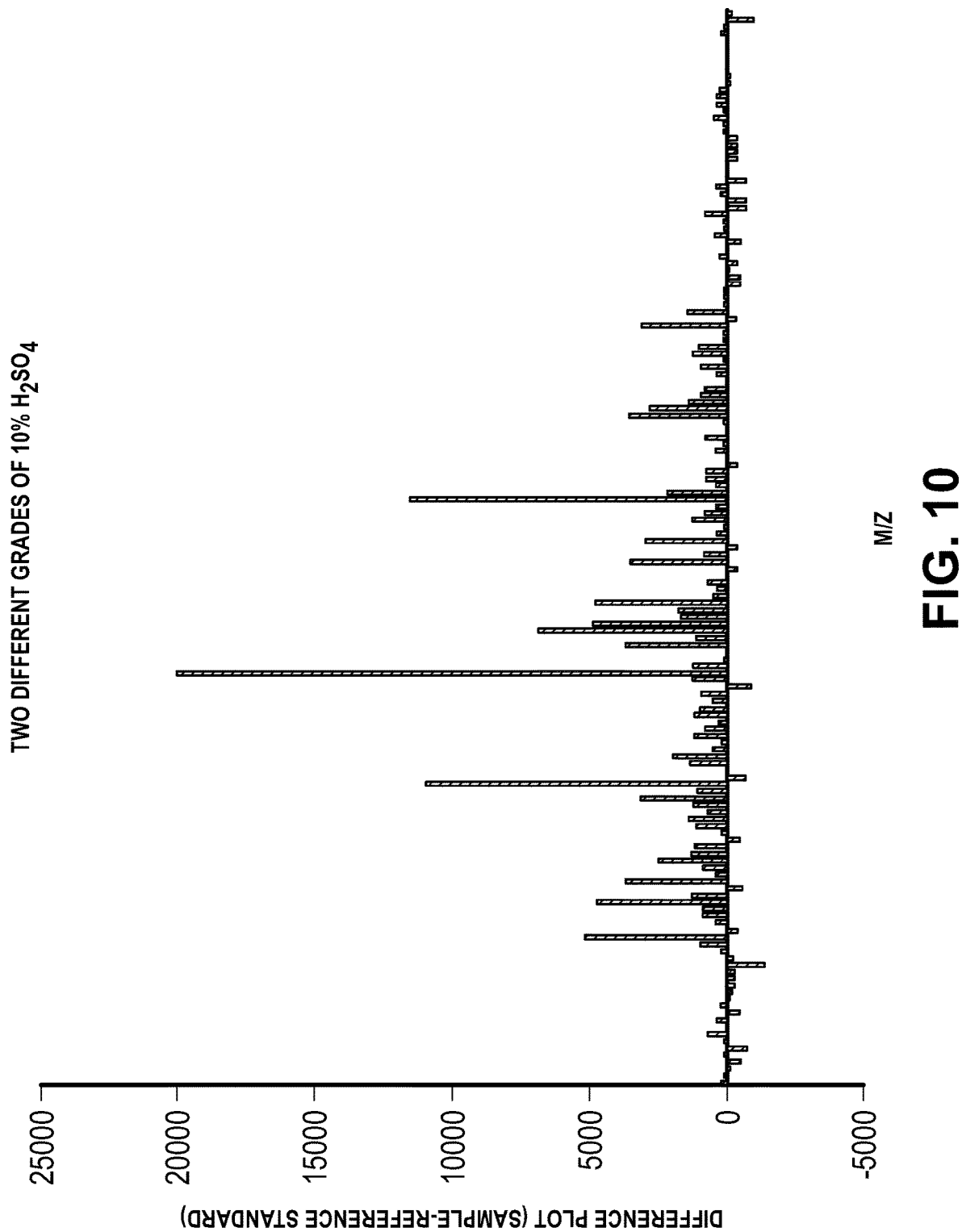
FIG. 10 is a plot of m/z versus a difference relative to a baseline value for two different grades of 10% $H_2SO_4$, performed using a procedure in accordance with an example embodiment of the present disclosure.
Figure 11:
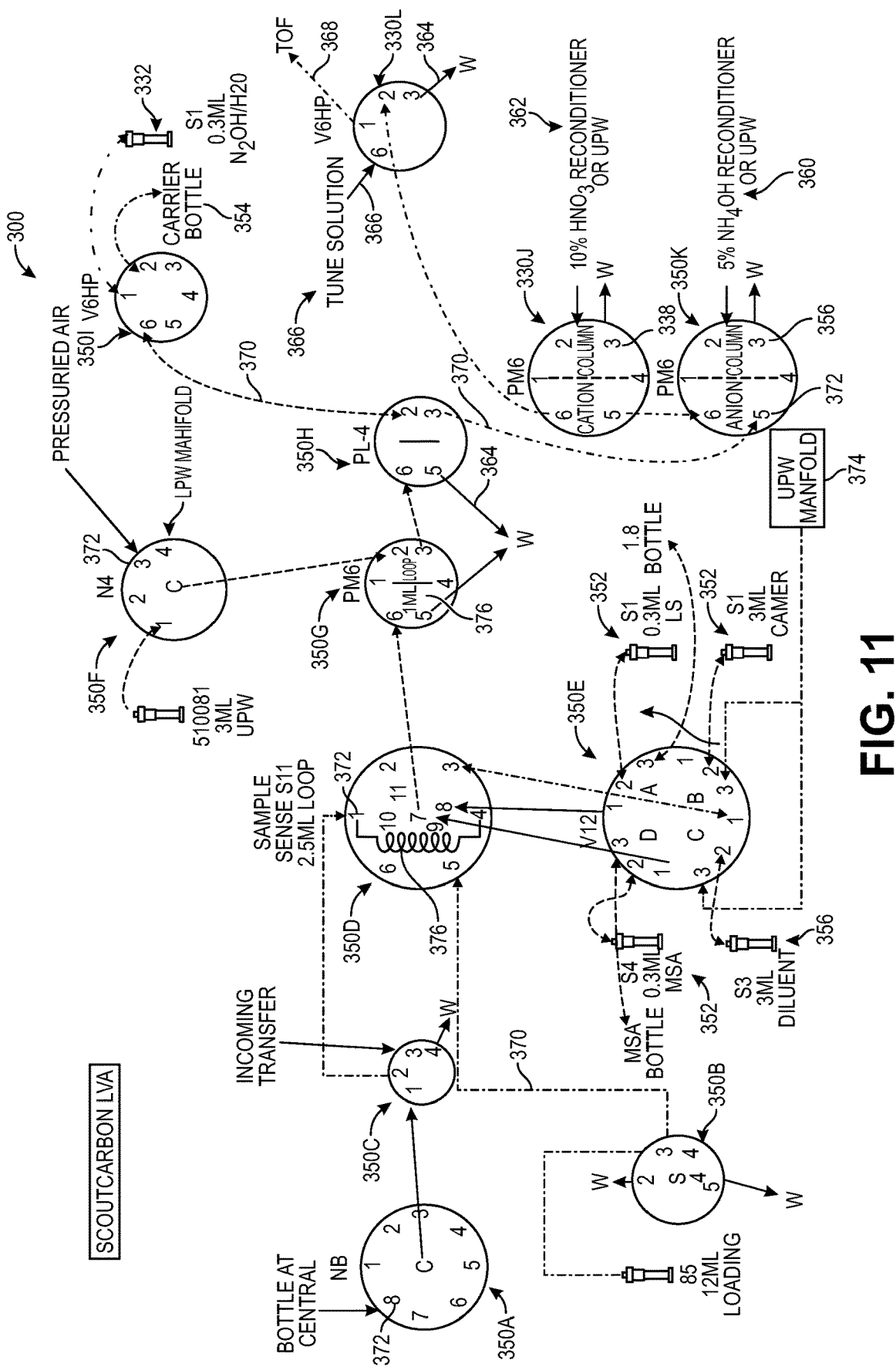
FIGS. 11-14 are a series of schematic diagrams illustrating an analysis system configured to achieve autodilution and/or auto-spiking while adding both reference ions and compound calibration ions to the same sample and facilitating that same sample to be injected through a single nebulizer, in accordance with an example embodiment of the present disclosure.

FIG. 10 shows an example plot made using a numeric change relative to a baseline standard as the basis for a data plot for detecting uncalibrated organic contaminants. Each line with a value greater than 0 represents a m/z that was observed in higher intensity than the baseline sample. Each of these are a potential contaminant found in the sample using 10% $H_2SO_4$ (by volume).

In an aspect of the present disclosure, a difference between mass-accurate reference ions and compound calibration can be defined. Mass-accurate reference ions can be used by a TOF-MS (e.g., TOF MS unit 118) to correctly assign m/z values for all ions observed. TOF-MS is a time-based form of MS. In such a process, ions can be sent in a "package" through the flight tube of the MS, with each one hitting a detector at a different time (e.g., a difference on the order of pico-seconds) because of their mass differential. The instrument can convert this time into a m/z value. Any slight shift in the time differential can cause the TOF-MS to read a different m/z. In an embodiment, two ions, each with a known m/z (currently at +121 and +922 in positive mode), can be used as reference ions for the TOF-MS. The establishment of reference ions is something automatically done by a given TOF-MS. A typical TOF-MS accomplishes this using two nebulizers, one for a given sample and one for reference masses. The present analysis system 100 can accomplish this through one nebulizer for both the sample and the reference masses, both reducing the number of system components employed and achieving lower detection limits relative to the standard two nebulizer system.

Compound calibration can be achieved for a compound that is not known by TOF-MS before analysis. It is injected into a TOF-MS and observed at a specific m/z value with an intensity relative to its concentration. This concentration can be changed through external calibration or MSA to obtain a calibration curve for that specific compound. Per above, one nebulizer can be used for both reference ions and compound calibration ions. In an embodiment, the present analysis system (e.g., system 100) can exhibit autodilution and auto-spiking capabilities that are able to add both reference ions and compound calibration ions to the same sample, which can be injected all at once through a single nebulizer.

FIGS. 11-14 illustrate an apparatus and concurrent method of achieving autodilution and/or auto-spiking while adding both reference ions and compound calibration ions to the same sample and facilitating that same sample to be injected through a single nebulizer, in accordance with an embodiment of the present disclosure. The analysis system 300 can generally include a plurality of multi-port valves 350A-350L, a plurality of injectable fluid sources 352 (e.g., shown as S1, S2, S3, etc., with each respectively serving as, for example, a source of a sample for testing, an MSA, a sample carrier, or a diluent), at least one carrier bottle 354, an anion exchange column 356, a cation exchange column 358, a first cleaning fluid source 360 (e.g., 5% (by weight) $NH_4OH$ reconditioner, another basic solvent, or ultra-pure water (UPW)), a second cleaning fluid source 362 (e.g., 10% (by weight) $HNO_3$ reconditioner, another acidic solvent, or UPW), one or more waste (W) locations 364, a tune solution source 366, a TOF-MS 368, and a plurality of fluid lines 370, as needed, to provide fluid interconnects between the multi-port valves 350A-350L and/or the other system components. Each of the multi-port valves 350A-350L can include a plurality of individual ports 372 (e.g., 4-12 ports 372), allowing fluid flow to be directed through, into, or out of a given multi-port valves 350A-350L. The multi-port valve 350D may be considered to be a "sample sense" multi-valve. The analysis system 300 can further include one or more UPW manifolds 374 and a plurality of sample loops 376, each such sample loop 376 being associated with a chosen multi-port valves 350A-350L, as illustrated. Similarly named parts in the various embodiments can be expected to be similarly constructed and to function similarly, unless otherwise stated.

Figure 12:
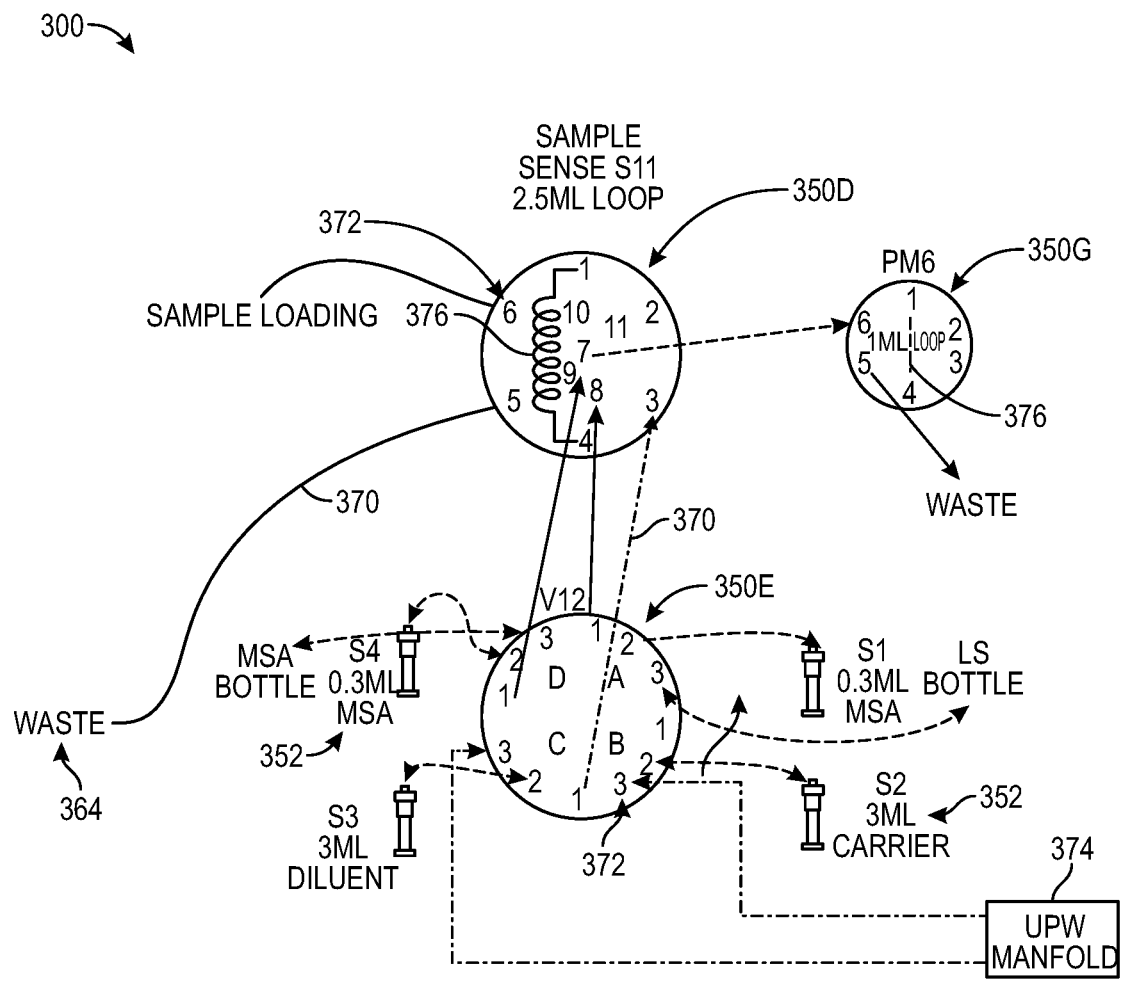
Figure 13:
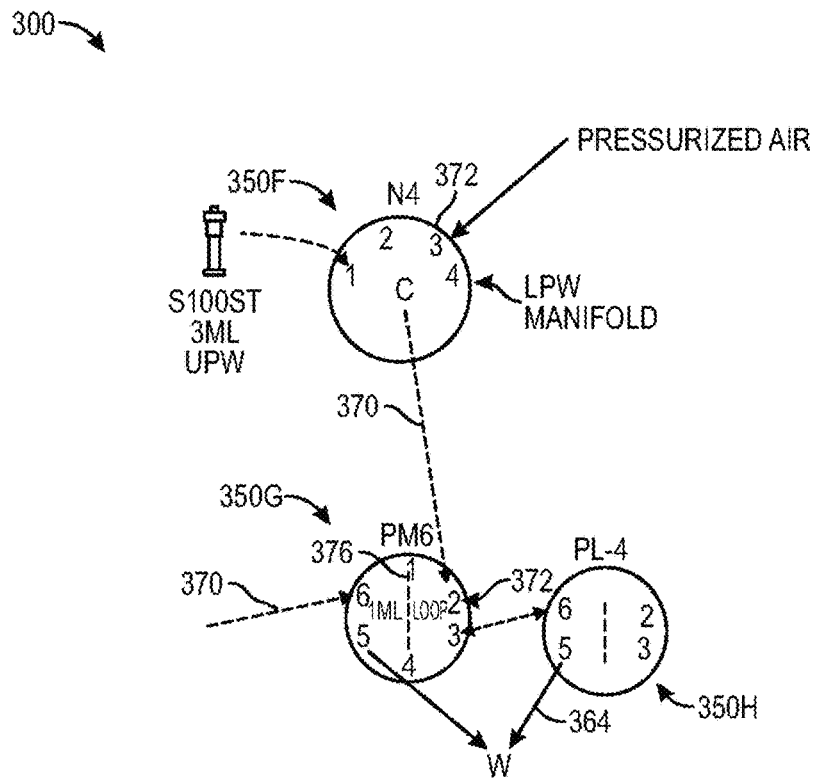
Figure 14:
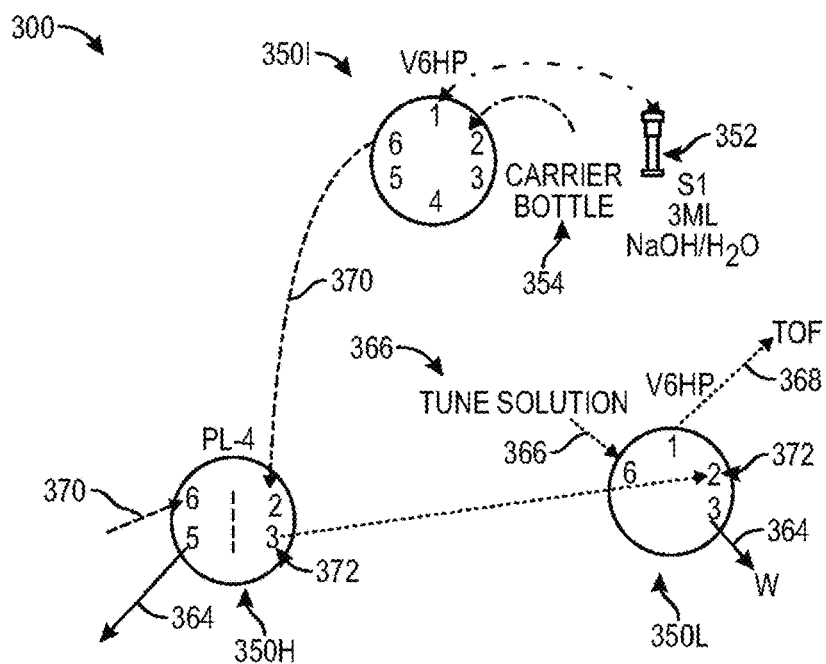

The process of using the analysis system 300 is best seen in FIGS. 12-14. As seen in FIG. 12, a sample, an MSA addition, a diluent, and/or an internal standard (e.g., from fluid sources 352) may be introduced into the multi-port valve 350D via the multi-port valve 350E. The sample, the MSA addition, the diluent, and/or the internal standard can all be pushed into a chosen port 372 of the multi-port valve 350D and then pushed to the sample loop 376 (e.g., a 1-ml loop) associated with the multi-port valve 350G (e.g., a PM6 valve). As seen in FIG. 13, a sample from the sample loop 376 of the multi-port valve 350G can be caught by the multi-port valve 350H (e.g., a PL-4 valve). As further seen in FIG. 13, the multi-port valve 350F may be configured to introduce one or more of a pressurized inert gas (e.g., argon (Ar)), another fluid, and/or UPW into the multi-port valve 350G. As seen from FIG. 14, the sample in the sample loop 376 of the multi-port valve 350G can ultimately be injected to the TOF-MS 368 for analysis, either by an infusion mode (as illustrated and thereby bypassing any of the ionization columns (e.g., avoiding an HPLC column)) or by a speciation mode (as discussed in relation to FIG. 3 and in accordance with an LCMS procedure).

Figure 17:
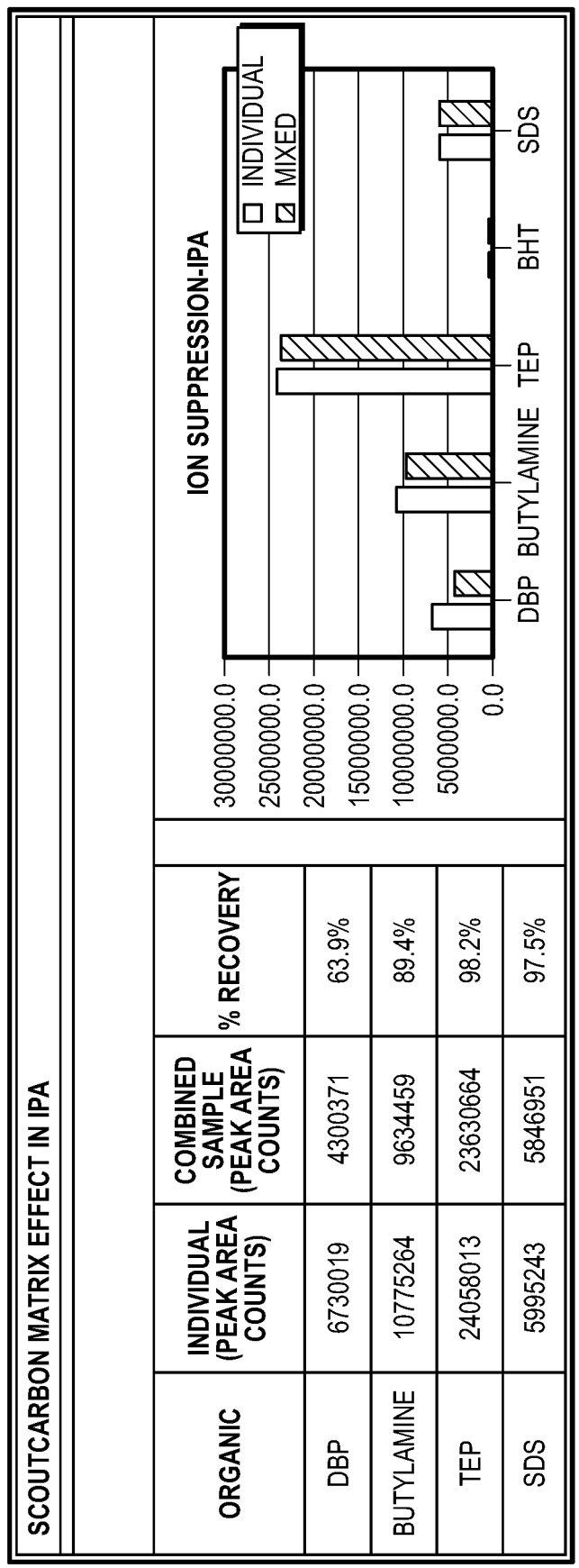
FIG. 17 is a data table and plot for the matrix effect in isopropyl alcohol (IPA), performed using a procedure in accordance with an example embodiment of the present disclosure.
Figure 18:
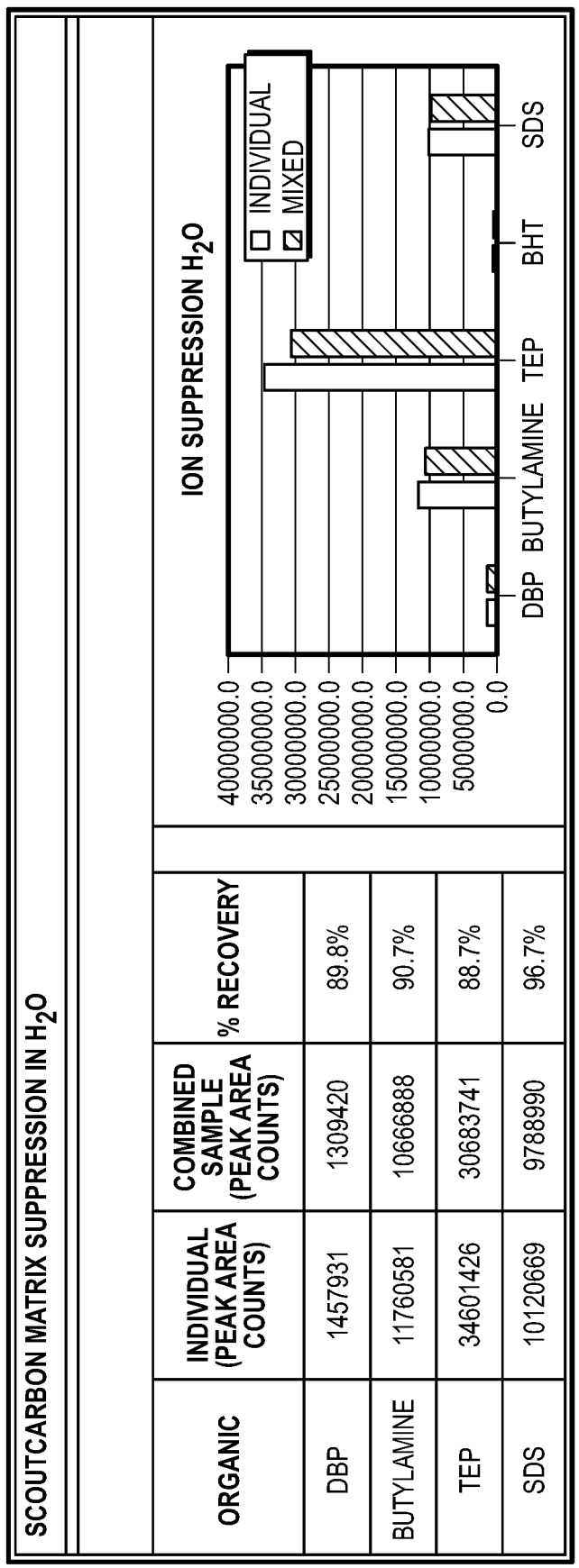
FIG. 18 is a data table and plot for the matrix suppression in water ($H_2O$), performed using a procedure in accordance with an example embodiment of the present disclosure.

FIGS. 15-19 illustrate comparative data in conjunction with processes performed using the present analysis system 100, 200, 300. FIGS. 15 and 16 show the sensitivity achievable for the analysis of various organics using TOF-MS and QQQ-MS. FIGS. 17-19 illustrate the effect of various carrier and/or matrix materials on various TOF-MS measurements.

In embodiments, the system controller (e.g., computer 132 of the analysis system 100) can include a processor, a memory, and a communications interface. The processor provides processing functionality for at least the controller and can include any number of processors, micro-controllers, circuitry, field programmable gate array (FPGA) or other processing systems, and resident or external memory for storing data, executable code, and other information accessed or generated by the controller. The processor can execute one or more software programs embodied in a non-transitory computer readable medium that implement techniques described herein. The processor is not limited by the materials from which it is formed or the processing mechanisms employed therein and, as such, can be implemented via semiconductor(s) and/or transistors (e.g., using electronic integrated circuit (IC) components), and so forth.

The memory can be an example of tangible, computer-readable storage medium that provides storage functionality to store various data and or program code associated with operation of the controller, such as software programs and/or code segments, or other data to instruct the processor, and possibly other components of the system 100, 200, 300, to perform the functionality described herein. Thus, the memory can store data, such as a program of instructions for operating the system (including its components), and so forth. It should be noted that while a single memory is described, a wide variety of types and combinations of memory (e.g., tangible, non-transitory memory) can be employed. The memory can be integral with the processor, can comprise stand-alone memory, or can be a combination of both.

Some examples of the memory can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, remove (e.g., server and/or cloud) memory, and so forth. In implementations, memory can include removable integrated circuit card (ICC) memory, such as memory provided by a subscriber identity module (SIM) card, a universal subscriber identity module (USIM) card, a universal integrated circuit card (UICC), and so on.

The communications interface can be operatively configured to communicate with components of the system 100, 200, 300. For example, the communications interface can be configured to transmit data for storage by the system 100, 200, 300, retrieve data from storage in the system 100, and so forth. The communications interface can also be communicatively coupled with the processor to facilitate data transfer between components of the system 100, 200, 300 and the processor. It should be noted that while the communications interface is described as a component of controller, one or more components of the communications interface can be implemented as external components communicatively coupled to the system 100, 300 or components thereof via a wired and/or wireless connection. The system 100, 300 or components thereof can also include and/or connect to one or more input/output (I/O) devices (e.g., via the communications interface), such as a display, a mouse, a touchpad, a touchscreen, a keyboard, a microphone (e.g., for voice commands) and so on.

The communications interface and/or the processor can be configured to communicate with a variety of different networks, such as a wide-area cellular telephone network, such as a cellular network, a 3G cellular network, a 4G cellular network, a 5G cellular network, or a global system for mobile communications (GSM) network; a wireless computer communications network, such as a WiFi network (e.g., a wireless local area network (WLAN) operated using IEEE 802.11 network standards); an ad-hoc wireless network, an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface can be configured to communicate with a single network or multiple networks across different access points. In a specific embodiment, a communications interface can transmit information from the controller to an external device (e.g., a cell phone, a computer connected to a WiFi network, cloud storage, etc.). In another specific embodiment, a communications interface can receive information from an external device (e.g., a cell phone, a computer connected to a WiFi network, cloud storage, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An analysis system, comprising:
   an initial multi-port valve configured to receive a sample;
   at least one intermediate multi-port valve fluidly connected to the initial multi-port valve and configured to receive the sample from the initial multi-port valve, a given intermediate multi-port valve having an ion-exchange column associated therewith, the given intermediate multi-port valve configured selectably to one of direct the sample through the ion-exchange column associated therewith or bypass the ion-exchange column, the sample directed through a chosen ion-exchange column as part of a speciation mode of operation to remove a matrix material from the sample, the sample directed to bypass any ion-exchange column as part of an infusion mode of operation;
   a further multi-port valve fluidly connected with the at least one intermediate multi-port valve and configured to receive the sample from the at least one intermediate multi-port valve;
   a time-of-flight mass spectrometer (TOF-MS) fluidly connected to the further multi-port valve; and
   a source of an organic-based wash solution for washing at least one of the given ion-exchange column or one or more fluid interconnects with the analysis system.

2. The analysis system of claim 1, wherein the ion-exchange column of a given intermediate multi-port valve is one of a cation exchange column or an anion exchange column.

3. The analysis system of claim 1, wherein, when operating in the speciation mode, the analysis system is configured to confirm a chemical composition of the sample through a combination of a retention time in a given ion-exchange column and an accurate mass to charge ratio (m/z) determined by the TOF-MS.

4. An analysis system, comprising:
   an initial multi-port valve configured to receive a sample;
   at least one intermediate multi-port valve fluidly connected to the initial multi-port valve and configured to receive the sample from the initial multi-port valve, a given intermediate multi-port valve having an ion-exchange column associated therewith, the given intermediate multi-port valve configured selectably to one of direct the sample through the ion-exchange column associated therewith or bypass the ion-exchange column, the sample directed through a chosen ion-exchange column as part of a speciation mode of operation to remove a matrix material from the sample, the sample directed to bypass any ion-exchange column as part of an infusion mode of operation;
a further multi-port valve fluidly connected with the at least one intermediate multi-port valve and configured to receive the sample from the at least one intermediate multi-port valve;
a time-of-flight mass spectrometer (TOF-MS) fluidly connected to the further multi-port valve; and
one or more transfer lines, a given transfer line used for testing for one or more metal components being made of a fluoropolymer tubing, a given transfer line used for testing for one or more organic components being made of PEEK (polyetheretherketone) or fused silica tubing.

5. The analysis system of claim 1, wherein the system includes a software configured to simultaneously detect for multiple organic components.

6. An analysis system, comprising:
an initial multi-port valve configured to receive a sample;
at least one intermediate multi-port valve fluidly connected to the initial multi-port valve and configured to receive the sample from the initial multi-port valve, a given intermediate multi-port valve having an ion-exchange column associated therewith, the given intermediate multi-port valve configured selectably to one of direct the sample through the ion-exchange column associated therewith or bypass the ion-exchange column, the sample directed through a chosen ion-exchange column as part of a speciation mode of operation to remove a matrix material from the sample, the sample directed to bypass any ion-exchange column as part of an infusion mode of operation;
a further multi-port valve fluidly connected with the at least one intermediate multi-port valve and configured to receive the sample from the at least one intermediate multi-port valve;
a time-of-flight mass spectrometer (TOF-MS) fluidly connected to the further multi-port valve; and
a software configured to perform a semi-quantitative test for previously unknown components using a high-resolution mass to charge ratio (m/z).

7. The analysis system of claim 6, wherein the software is configured to express unknown compounds based upon a deviation from a baseline.

8. An analysis system, comprising:
an initial multi-port valve configured to receive a sample;
at least one intermediate multi-port valve fluidly connected to the initial multi-port valve and configured to receive the sample from the initial multi-port valve, a given intermediate multi-port valve having an ion-exchange column associated therewith, the given intermediate multi-port valve configured selectably to one of direct the sample through the ion-exchange column associated therewith or bypass the ion-exchange column, the sample directed through a chosen ion-exchange column as part of a speciation mode of operation to remove a matrix material from the sample, the sample directed to bypass any ion-exchange column as part of an infusion mode of operation;
a further multi-port valve fluidly connected with the at least one intermediate multi-port valve and configured to receive the sample from the at least one intermediate multi-port valve;
a time-of-flight mass spectrometer (TOF-MS) fluidly connected to the further multi-port valve; and
a software configured to account for a polarity of a given component.

9. An analysis system, comprising:
an initial multi-port valve configured to receive a sample;
at least one intermediate multi-port valve fluidly connected to the initial multi-port valve and configured to receive the sample from the initial multi-port valve, a given intermediate multi-port valve having an ion-exchange column associated therewith, the given intermediate multi-port valve configured selectably to one of direct the sample through the ion-exchange column associated therewith or bypass the ion-exchange column, the sample directed through a chosen ion-exchange column as part of a speciation mode of operation to remove a matrix material from the sample, the sample directed to bypass any ion-exchange column as part of an infusion mode of operation;
a further multi-port valve fluidly connected with the at least one intermediate multi-port valve and configured to receive the sample from the at least one intermediate multi-port valve;
a time-of-flight mass spectrometer (TOF-MS) fluidly connected to the further multi-port valve; and a software configured to add any newly observed component to a database.

10. The analysis system of claim 1, wherein the system is configured to perform at least one of autocalibration or autodilution.

11. An analysis system, comprising:
an initial multi-port valve configured to receive a sample;
at least one intermediate multi-port valve fluidly connected to the initial multi-port valve and configured to receive the sample from the initial multi-port valve, a given intermediate multi-port valve having an ion-exchange column associated therewith, the given intermediate multi-port valve configured selectably to one of direct the sample through the ion-exchange column associated therewith or bypass the ion-exchange column, the sample directed through a chosen ion-exchange column as part of a speciation mode of operation to remove a matrix material from the sample, the sample directed to bypass any ion-exchange column as part of an infusion mode of operation;
a further multi-port valve fluidly connected with the at least one intermediate multi-port valve and configured to receive the sample from the at least one intermediate multi-port valve;
a time-of-flight mass spectrometer (TOF-MS) fluidly connected to the further multi-port valve, wherein the TOF-MS is configured to use one nebulizer for both mass correction and sample introduction.

12. An analysis system, comprising:
an initial multi-port valve configured to receive a sample;
at least one intermediate multi-port valve fluidly connected to the initial multi-port valve and configured to receive the sample from the initial multi-port valve, a given intermediate multi-port valve having an ion-exchange column associated therewith, the given intermediate multi-port valve configured selectably to one of direct the sample through the ion-exchange column associated therewith or bypass the ion-exchange column, the sample directed through a chosen ion-exchange column as part of a speciation mode of operation to remove a matrix material from the sample, the sample directed to bypass any ion-exchange column as part of an infusion mode of operation;
- a further multi-port valve fluidly connected with the at least one intermediate multi-port valve and configured to receive the sample from the at least one intermediate multi-port valve;
- a time-of-flight mass spectrometer (TOF-MS) fluidly connected to the further multi-port valve, wherein the TOF-MS employs a platinum nebulizer.

13. The analysis system of claim 1, further including a sample preparation unit configured to dilute a sample by up to 10% by volume to improve at least one of sample transfer or recovery of any organic components.

14. The analysis system of claim 1, further including an inductively coupled plasma mass spectrometer (ICP-MS) configured to detect at least one metal or particle component, the TOF-MS configured to detect at least one organic component.

* * * * *